J. P. Manny.
Harvester Rake.

№ 112363 Patented Mar. 7, 1871.

Witnesses:—
Wm. H. Rowe
Chas. W. O'Neill

Inventor:—
John P. Manny
by his Atty
Wm. D. Baldwin

UNITED STATES PATENT OFFICE.

JOHN P. MANNY, OF ROCKFORD, ILLINOIS.

IMPROVEMENT IN HARVESTER-RAKES.

Specification forming part of Letters Patent No. 112,363, dated March 7, 1871.

*To all whom it may concern:*

Be it known that I, JOHN P. MANNY, of Rockford, in the county of Winnebago and State of Illinois, have invented a new and useful Improvement in Harvester-Rakes, of which the following is a specification:

My invention relates to that class of automatic rakes in which a continuously-revolving reel is combined with a rake revolving continuously in a uniform path.

Its object is to turn and deliver the grain at the side of the machine without the use of cams; and to this end the improvement herein claimed consists in a novel method of combining a reel rotating continuously on a horizontal axis parallel with the finger-beam with a rake revolving synchronously with the reel on an axis intersecting and inclined acutely to that of the reel hub or shaft, as hereinafter fully set forth.

The accompanying drawing represents so much only of a harvester as is necessary to illustrate the mechanism constituting the subject-matter of the invention herein claimed.

In practice my improvement will, of course, be adapted to the fully-organized harvesters of the present day, whether front or rear cut, one or two wheeled machines, or having jointed or rigid finger-beams.

Figure 1:
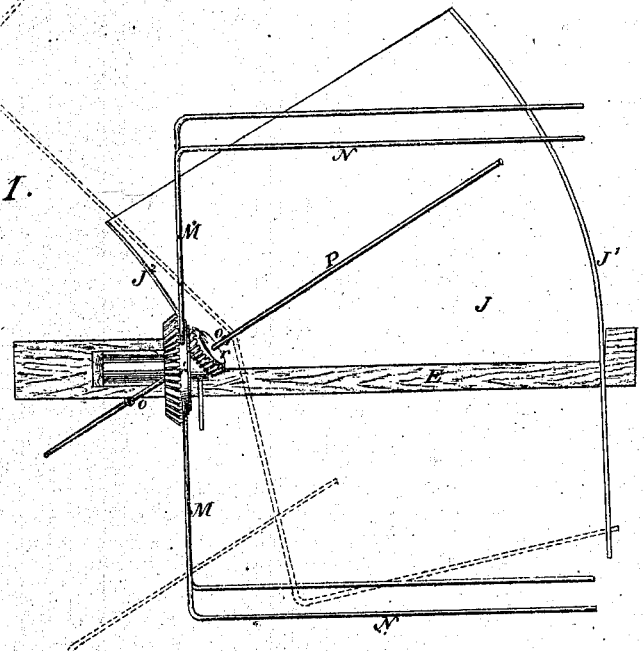
Figures 2, 3:
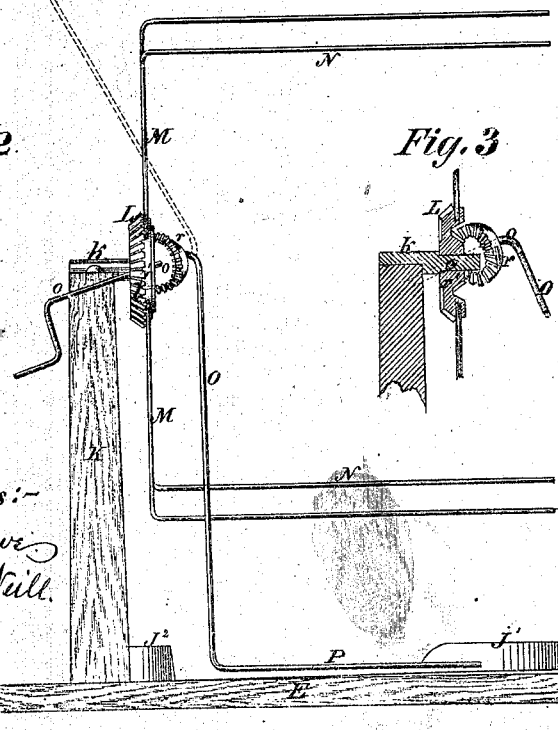

Figure 1 shows a plan, and Fig. 2 a front elevation, of my improvement; Fig. 3, a vertical longitudinal section through the reel-hub.

To a finger-beam, E, is secured a platform, J, by preference concave, and curved in the form of the segment of the frustum of a cone, and provided with fences or guards $J^1$ $J^2$. A reel post or standard, K, is mounted on the heel end of the finger-beam. A stud-axle, $k$, projects horizontally from this post, and carries a hub, L, having a gear-wheel, $l$, on one side, by which it may be driven by proper gearing from the driving-wheel, and a similar gear, $r'$, on the other side, to drive the rake, as hereinafter described. Reel ribs or beaters N, mounted on arms M, radiating from the hub L, constitute the reel.

The rake-shaft $o$ extends through the stud $k$ and hub L, being inclined both upward and backward, as shown in the drawing. A gear-wheel, $r$, on this shaft, meshes with the gear $r'$, above mentioned, and thus rotates the rake.

The rake-arm O is bent at an acute angle to the shaft, as shown in the drawing, and carries a rake-head, P, on its outer end, as usual.

In operation the reel reels the grain back upon the platform, from which, when cut, it is removed by the rake, which, owing to its angular arrangement relative to the finger-beam and platform, sweeps over them diagonally, drawing the grain toward the stubble side of the machine, and discharging it out of the path of the team on the next round. I thus discharge the cut grain without the use of cams.

Having described and claimed another method of attaining this result in another application for Letters Patent, filed March 28, 1870, of which this is a division, I do not, broadly, claim herein the combination of a rotating reel and a rotating rake, but the devices herein claimed constitute an improvement on those shown in that application, being more simple and easier in their application. Moreover, the gear $r'$ in this improvement being concentric with the reel-axis, while the gear $r$ is concentric with the rake-axis, instead of being eccentric to it, as in the application aforesaid, this rake revolves synchronously with the reel, instead of having the differential movement characteristic of the other rake.

I claim as my invention—

1. The combination of the reel rotating continuously on a horizontal axis with the continuously-rotating rake mounted on an axis intersecting that of the reel, and inclined backward and upward at an angle acute to the finger-beam, these parts being constructed and operating in combination, substantially as hereinbefore set forth.

2. The combination of the horizontal reel hub or shaft, the bevel-gear $r'$, mounted thereon and concentric therewith, the rake-shaft, inclined at an angle acute to the reel-shaft, and the bevel-gear $r'$, mounted on and concentric with said rake-shaft, all these parts being constructed to operate in combination, substantially as hereinbefore set forth.

In testimony whereof I have hereunto subscribed my name.

JOHN P. MANNY.

Witnesses:
WILLIAM C. BLINN,
LEWIS A. WEYBURN.